United States Patent
Xu et al.

(10) Patent No.: US 8,131,711 B2
(45) Date of Patent: *Mar. 6, 2012

(54) SYSTEM, METHOD, AND COMPUTER-READABLE MEDIUM FOR PARTIAL REDISTRIBUTION, PARTIAL DUPLICATION OF ROWS OF PARALLEL JOIN OPERATION ON SKEWED DATA

(75) Inventors: Yu Xu, San Diego, CA (US); Pekka Kostamaa, Santa Monica, CA (US)

(73) Assignee: Teradata Corporation, Dayton, OH (US)

( * ) Notice: Subject to any disclaimer, the term of this patent is extended or adjusted under 35 U.S.C. 154(b) by 911 days.

This patent is subject to a terminal disclaimer.

(21) Appl. No.: 12/125,299

(22) Filed: May 22, 2008

(65) Prior Publication Data
US 2009/0292668 A1   Nov. 26, 2009

(51) Int. Cl.
*G06F 17/30* (2006.01)
(52) U.S. Cl. .............................. 707/714; 707/E17.005
(58) Field of Classification Search ........... 707/999.002, 707/999.201, 698, 626, 633–636, E17.005, 707/E17.054, 714
See application file for complete search history.

(56) References Cited

U.S. PATENT DOCUMENTS

| | | | | |
|---|---|---|---|---|
| 5,978,576 A | * | 11/1999 | Sanadidi et al. | 703/22 |
| 7,054,852 B1 | * | 5/2006 | Cohen | 1/1 |
| 2004/0059743 A1 | * | 3/2004 | Burger | 707/101 |
| 2006/0106777 A1 | * | 5/2006 | Faunce et al. | 707/3 |
| 2007/0130231 A1 | * | 6/2007 | Brown et al. | 707/204 |
| 2009/0024568 A1 | * | 1/2009 | Al-Omari et al. | 707/2 |

* cited by examiner

Primary Examiner — Tim T Vo
Assistant Examiner — Shiow-Jy Fan
(74) Attorney, Agent, or Firm — Steve McDonald; Ramin Mahboubian (57) ABSTRACT

A system, method, and computer-readable medium that facilitate management of data skew during a parallel join operation are provided. Portions of tables involved in the join operation are distributed among a plurality of processing modules, and each of the processing modules is provided with a list of skewed values of a join column of a larger table involved in the join operation. Each of the processing modules scans the rows of the tables distributed to the processing modules and compares values of the join columns of both tables with the list of skewed values. Rows of the larger table having non-skewed values in the join column are redistributed, and rows of the larger table having skewed values in the join column are maintained locally at the processing modules. Rows of the smaller table that have non-skewed values in the join column are redistributed, and rows of the smaller table that have skewed values in the join column are duplicated among the processing modules.

20 Claims, 8 Drawing Sheets

Figure 8

SYSTEM, METHOD, AND COMPUTER-READABLE MEDIUM FOR PARTIAL REDISTRIBUTION, PARTIAL DUPLICATION OF ROWS OF PARALLEL JOIN OPERATION ON SKEWED DATA

BACKGROUND

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One of the goals of a database management system is to optimize the performance of queries for access and manipulation of data stored in the database. Given a target environment, an optimal query plan is selected, with the optimal query plan being the one with the lowest cost (e.g., response time) as determined by an optimizer. The response time is the amount of time it takes to complete the execution of a query on a given system.

In massively parallel processing (MPP) systems, dealing with data skew in parallel joins is critical to the performance of many applications. As is understood, a join comprises a structured query language (SQL) operation that combines records from two or more tables. Assume a join is to be performed in parallel by one hundred processing modules, e.g., Access Module Processors (AMPs), with a large relation R having 10 million rows and a smaller relation S having 1 million rows featuring a join condition R.a=S.b (where a and b are columns of the relations R and S). Assume both R and S are evenly partitioned across all processing AMPs and neither R.a nor S.b is the primary index, e.g., the values that are hashed to distribute the base table rows to MPP processing modules, of R or S. As referred to herein, hash redistribution comprises generating a hash value of, for example, column or index values of a table and redistributing the corresponding rows to processing modules based on the hash values. Without data skew in column R.a (e.g., relation R can be roughly evenly hash partitioned on R.a), the optimizer may hash redistribute rows of R on R.a and hash redistribute rows of S on S.b to join R and S. Each AMP will join approximately 100,000 rows of R and 10,000 rows of S.

However, consider the case where there is data skew in column R.a. Assume there is a single data value of column R.a which appears in 1 million rows of R. The above redistribution plan will redistribute 1 million rows of R with the skewed value in R.a to a single AMP. In this instance, the AMP having 1 million rows redistributed thereto will have an excessive load with respect to other AMPs involved in the join operation. An AMP featuring an excessive load in such a situation is referred to herein as a hot AMP. In the present example, the hot AMP will have about 1,090,000 rows while all other 99 AMPs will have only about 90,000 rows of R. Consequently, the system performance is degraded and may result in an "out of spool space" error on the hot AMP, which causes queries to abort often after hours of operation in large data warehouses. Out of spool space may happen because, although disk capacity continues to become larger and cheaper, parallel DBMSs still maintain spool space quotas for users on each AMP for the purpose of workload management and concurrency control.

Alternatively, the optimizer may choose to duplicate the rows of the relation S on every AMP where R resides and not redistribute the rows of R. Such a mechanism is referred to as table duplication. Table duplication may result in poor performance for systems featuring a large number of AMPs. For example, if there are one hundred AMPs involved in the join operation, the system is required to duplicate 100 million rows of the relation S to perform the join operation. Assume the size of the relation S is 200 MB. In this instance, 20 GB of spool space is disadvantageously required for the duplication of the relation S. Further, with a large number of AMPs, the duplication process may take an excessive duration to complete because only a single broadcast may be performed at any point of time.

SUMMARY

Disclosed embodiments provide a system, method, and computer readable medium for resolving data skew issues when executing a parallel join. Rows of tables involved in a join operation are distributed among a plurality of processing modules, and each of the processing modules is provided with a list of skewed values of a join column of a larger table involved in the join operation. Each of the processing modules scans the rows of the tables distributed to the processing modules and compares values of the join columns of both tables with the list of skewed values. Rows of the larger table having non-skewed values in the join column are redistributed, and rows of the larger table having skewed values in the join column are maintained locally at the processing modules. Rows of the smaller table that have non-skewed values in the join column are redistributed, and rows of the smaller table that have skewed values in the join column are duplicated among the processing modules.

BRIEF DESCRIPTION OF THE DRAWINGS

Aspects of the present disclosure are best understood from the following detailed description when read with the accompanying figures, in which.

DETAILED DESCRIPTION

It is to be understood that the following disclosure provides many different embodiments or examples for implementing different features of various embodiments. Specific examples of components and arrangements are described below to simplify the present disclosure. These are, of course, merely examples and are not intended to be limiting.

Figure 1:
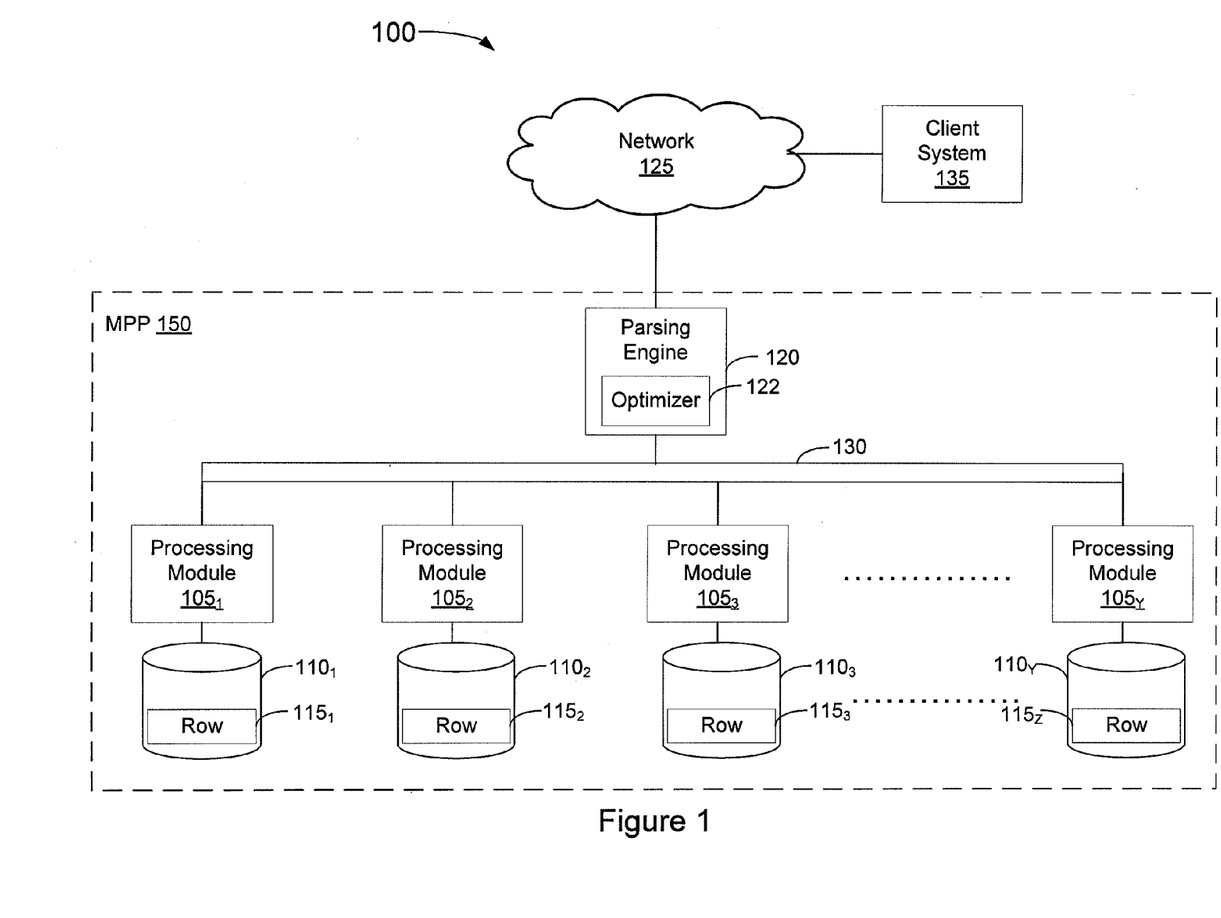
FIG. 1 depicts a diagrammatic representation of an exemplary architecture for a large database system that is suited for implementing a partial redistribution, partial duplication mechanism that facilitates processing of a parallel join operation with data skew in accordance with disclosed embodiments.

FIG. 1 depicts a diagrammatic representation of an exemplary architecture for a large database system 100, such as a Teradata Active Data Warehousing System, that is suited for implementing a partial redistribution, partial duplication mechanism that facilitates processing of a parallel join operation with data skew in accordance with disclosed embodiments. The database system 100 includes a relational database management system (RDBMS) built upon a massively parallel processing (MPP) system 150. Other types of database systems, such as object-relational database management systems (ORDBMS) or those built on symmetric multi-processing (SMP) platforms, are also suited for use, and the depicted and described architecture is exemplary only and is chosen to facilitate an understanding of the disclosed embodiments.

As shown, the database system 100 includes one or more processing modules $105_{1 \ldots Y}$ that manage the storage and retrieval of data in data-storage facilities $110_{1 \ldots Y}$. Each of the processing modules may host one or more AMPs. Each of the processing modules $105_{1 \ldots Y}$ manages a portion of a database that is stored in a corresponding one of the data-storage facilities $110_{1 \ldots Y}$. Each of the data-storage facilities $110_{1 \ldots Y}$ includes one or more disk drives or other storage medium.

The system stores data in one or more tables in the data-storage facilities $110_{1 \ldots Y}$. The rows $115_{1 \ldots Z}$ of the tables are stored across multiple data-storage facilities $110_{1 \ldots Y}$ to ensure that the system workload is distributed evenly across the processing modules $105_{1 \ldots Y}$. A parsing engine 120 organizes the storage of data and the distribution of table rows $115_{1 \ldots Z}$ among the processing modules $105_{1 \ldots Y}$ and accesses processing modules $105_{1 \ldots Y}$ via an interconnect 130. The parsing engine 120 also coordinates the retrieval of data from the data-storage facilities $110_{1 \ldots Y}$ in response to queries received from a user, such as one using a client computer system 135 connected to the database system 100 through a network connection 125. The parsing engine 120, on receiving an incoming database query, applies an optimizer 122 component to the query to assess the best plan for execution of the query. Selecting the optimal query-execution plan includes, among other things, identifying which of the processing modules $105_{1 \ldots Y}$ are involved in executing the query and which database tables are involved in the query, as well as choosing which data-manipulation techniques will serve best in satisfying the conditions of the query. Database statistics are used in making these assessments during construction of the query-execution plan. For example, database statistics may be used by the optimizer to determine data demographics, such as attribute minimum and maximum values and data ranges of the database. Further, database statistics may be obtained to identify highly repetitive, or skewed, values. The database system typically receives queries in a standard format, such as the Structured Query Language (SQL) put forth by the American National Standards Institute (ANSI).

In a system in which rows of tables or relations may be distributed across multiple processing nodes, a join operation executed in parallel may be performed efficiently when the data is uniformly distributed across the system. Table rows may be redistributed across AMPs by hashing the columns that are involved in the join and redistributing the rows according to the hashed column values in the event that the columns involved in the parallel join are not primary indexes on which the table columns are originally distributed within the MPP system.

However, if one processing module, e.g., an AMP, receives much more data than other AMPs, processing of a parallel join may demonstrate a relatively slow response time, excessive system resource usage, and such an operation may exhibit a low overall system parallel efficiency. Adding additional nodes or AMPs may decrease the overall parallel efficiency since adding more nodes may result in distribution of less rows to each non-hot AMP thereby producing a greater relative disproportionate distribution of rows to the hot AMP.

An AMP may receive significantly more data due to various causes, such as a natural demographic data skew, e.g., high biased values, skew resulting from null values, or various other causes. When executing a parallel join, a table may be duplicated to each AMP involved in processing of the parallel join if the table is much smaller than the other table involved in the parallel join.

Most base tables, e.g., user-defined tables that are physically stored in system 100, have carefully designed primary indexes to evenly distribute rows across all AMPs of a MPP system. However, skew naturally and frequently occurs in certain types of join operations. Redistribution of tables on join columns often results in severely degraded performance if a join column has highly-skewed values. Duplication of the smaller table involved in a join is typically efficient when skew occurs in the join column of the larger table assuming the rows are evenly distributed across the AMPs. However, the duplication cost is not scalable—the larger the system, the more expensive table duplication is in terms of both I/O and CPU cost on all AMPs as well as the overall network bandwidth. In accordance with disclosed embodiments, a partial redistribution, partial duplication mechanism is provided that alleviates problems commonly encountered with table redistribution and table duplication mechanisms.

Figure 2:
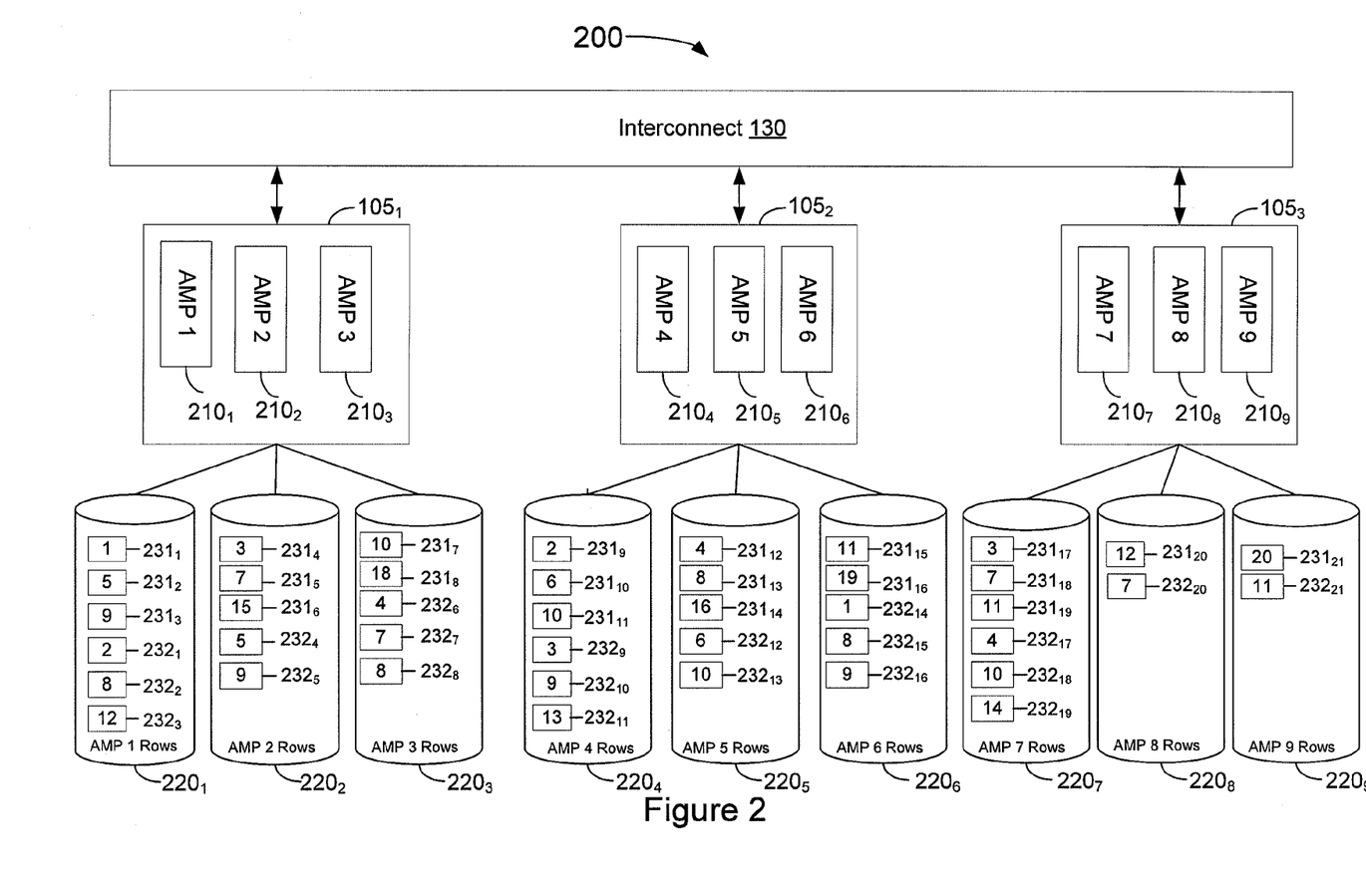
FIG. 2 is a diagrammatic representation of a massively parallel processing system configuration in which a table redistribution may be performed to facilitate execution of a parallel join.

FIG. 2 is a diagrammatic representation of an MPP configuration 200 in which a table redistribution may be performed to facilitate execution of a parallel join. In the illustrative example, assume the rows of two tables have been distributed across nine AMPs $210_1$-$210_9$ hosted by processing modules $105_1$-$105_3$ such that each of the AMPs is allocated rows $220_1$-$220_9$. Consider a join operation to be executed that is specified by the following:

Select * from Table1, Table2 where Table1.a=Table2.b

Figure 3:
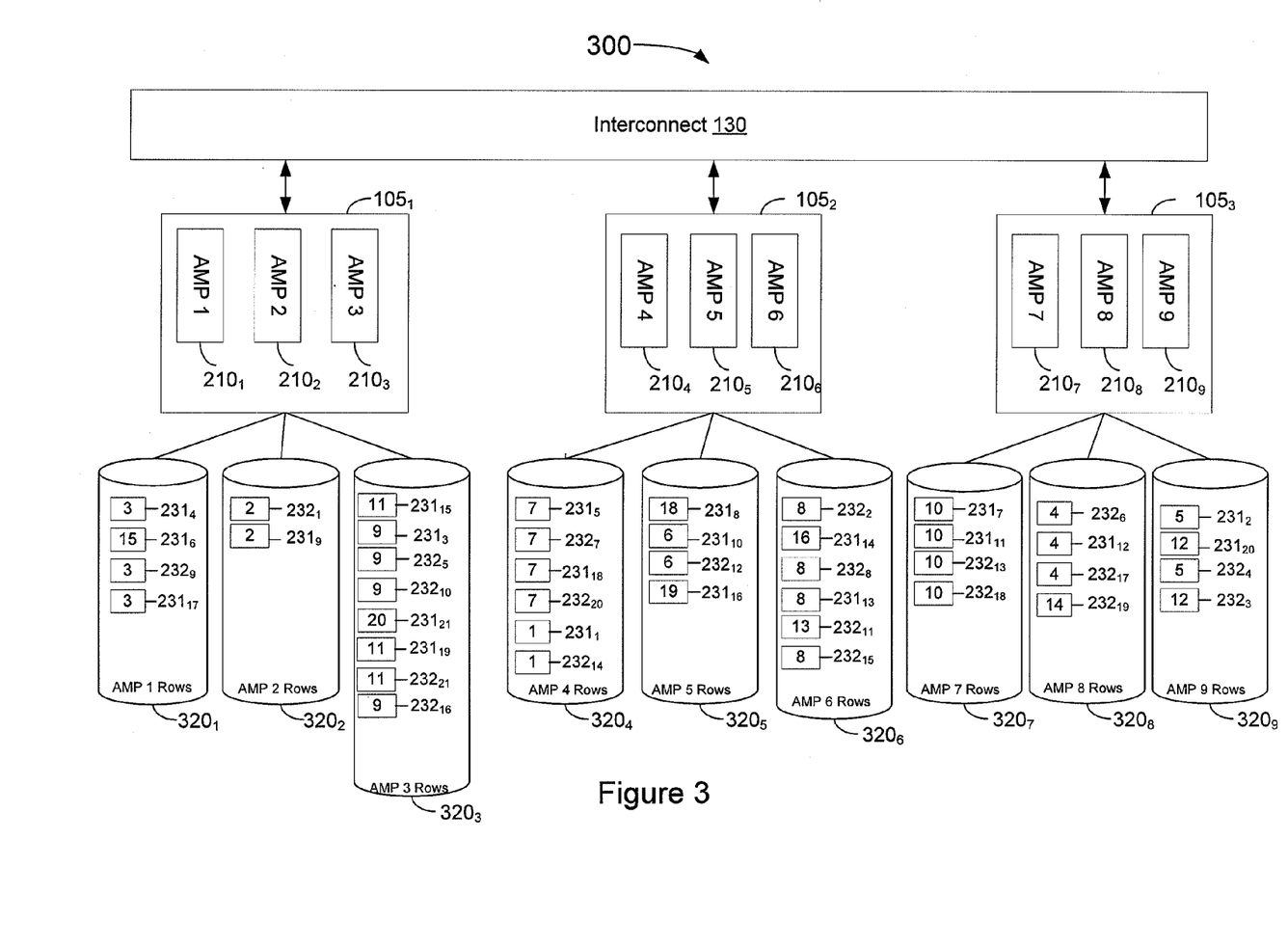
FIG. 3 depicts a diagrammatic representation of a redistribution of the table rows depicted in FIG. 2 that facilitates execution of the join operation.

In the present example, column a elements of Table1 are designated $231_1$-$231_{21}$ and column b elements of Table2 are designed $232_1$-$232_{21}$. Assume that the rows of Table1 and Table2 are distributed among AMPs $210_1$-$210_9$ via a hash of primary indexes of Table1 and Table2 and that the primary indexes include neither column a of Table1 nor column b of Table2. In this situation, the rows may be redistributed by hashing the join columns Table1.a and Table2.b and redistributing the rows based on the hash values such that rows from Table1 and Table2 that match on the join columns Table1.a and Table2.b are redistributed to the same processing modules or AMPs. For example, FIG. 3 depicts a diagrammatic representation 300 of a redistribution of the table rows $220_1$-$220_9$ that facilitates execution of the join operation. Each AMP $210_1$-$210_9$ hashes the rows $220_1$-$220_9$ originally distributed thereto, and redistributes the rows according to the hash values. Accordingly, the AMPs $210_1$-$210_9$ respectively receive redistributed rows $320_1$-$320_9$. By hashing the join columns and redistributing the rows accordingly, matching column elements are redistributed to a common AMP, and the join statement may then be completed in parallel. For example, element $231_1$ of Table1.a has a value of "1", and element $232_{14}$ of Table 2.b has a value of "1". Because neither column a of Table1 nor column b of Table2 is included in the primary indexes by which the tables are originally distributed in the MPP system, the Table1 row including the column value $231_1$ and the Table2 row including the column value $232_{14}$ are originally distributed to AMP $210_1$ and $210_6$ as depicted in FIG. 2. By hashing the columns of the join statement and redistributing the tables according to the hashed elements, both the Table1 row including the column value $231_1$ and the Table2 row including the column value $232_{14}$ are redistributed to a common AMP, e.g., AMP $210_4$ as depicted in FIG. 3. After hash redistribution of the tables, the join operation may then be executed in parallel.

Redistribution of tables for execution of a parallel join is efficient if data skew is small. However, numerous problems may be encountered in the event that there is data skew in a column on which a join is to be performed as discussed hereinabove.

In accordance with an embodiment, data skew issues are managed by detecting data skew in a table involved in the join operation and providing the optimizer 122 with a list L of skewed values. In the examples provided herein, it is assumed that a join is to be performed on column "a" of a table designated Table1 and a column "b" of a table designated Table2. It is further assumed that the values of Table1.a are skewed, that the skew of Table1 is detected, and a list L of skewed values of Table1.a is provided to the optimizer 122 or is generated by the optimizer. A disclosed partial redistribution, partial duplication mechanism is provided that significantly alleviates performance issues of a parallel join involving skewed data.

On each AMP where rows of the larger, skewed table Table1 resides, a full table scan of Table1 is performed a single time. Alternatively, the scan may be performed on an index of the Table1 if there are selections and applicable indexes built on Table1. A spool is then allocated for each AMP having rows of Table1. The spool, $\text{Spool}^1_{local}$, contains all rows of Table1 having an attribute value of Table1.a that matches any value in the list L of skewed values. Each AMP hashes the join column Table1.a of rows and redistributes the rows to other AMPs if the Table1.a value is not skewed. If the Table1.a value of a row matches a skewed value, the AMP does not redistribute the row but instead appends the row to the spool $\text{Spool}^1_{local}$.

On each AMP where the Table2 resides, a full table scan of Table2 is performed once. Alternatively, a full scan of an index of Table2 may be performed if there are selections on Table2 and there are applicable indexes built on Table2. If the Table2.b value of a row matches a skewed value, the row is appended to a duplicate buffer, or other suitable memory space, allocated to the AMP. Upon completion of the table scan by an AMP, the rows that have been identified as having a skewed value of the column Table2.b are duplicated to a respective spool $\text{Spool}^2_{dup}$ of each AMP where Table1 resides. For example, duplication of the rows of Table2 having a skewed column Table2.b value may be performed by the interconnect 130, associated hardware and/or software.

Each AMP may allocate a respective spool $\text{Spool}^1_{redis}$ in which the AMP appends rows of Table1 that have been redistributed to the AMP. Likewise, each AMP may allocate a respective spool $\text{Spool}^2_{redis}$ in which the AMP appends rows of Table2 that have been redistributed to the AMP.

When the partial redistribution and partial duplication of the tables has been completed, each AMP then generates a first data set by joining the contents of the AMP's spools $\text{Spool}^1_{redis}$ and $\text{Spool}^2_{redis}$. Each AMP generates a second data set by joining the contents of the AMP's spools $\text{Spool}^1_{local}$ and $\text{Spool}^2_{dup}$. A local join data set is then generated by each AMP by generating a union of the spool's first data set and second data set. The parallel join operation is then completed by performing a merge of each AMP's local join data set.

Figure 4:
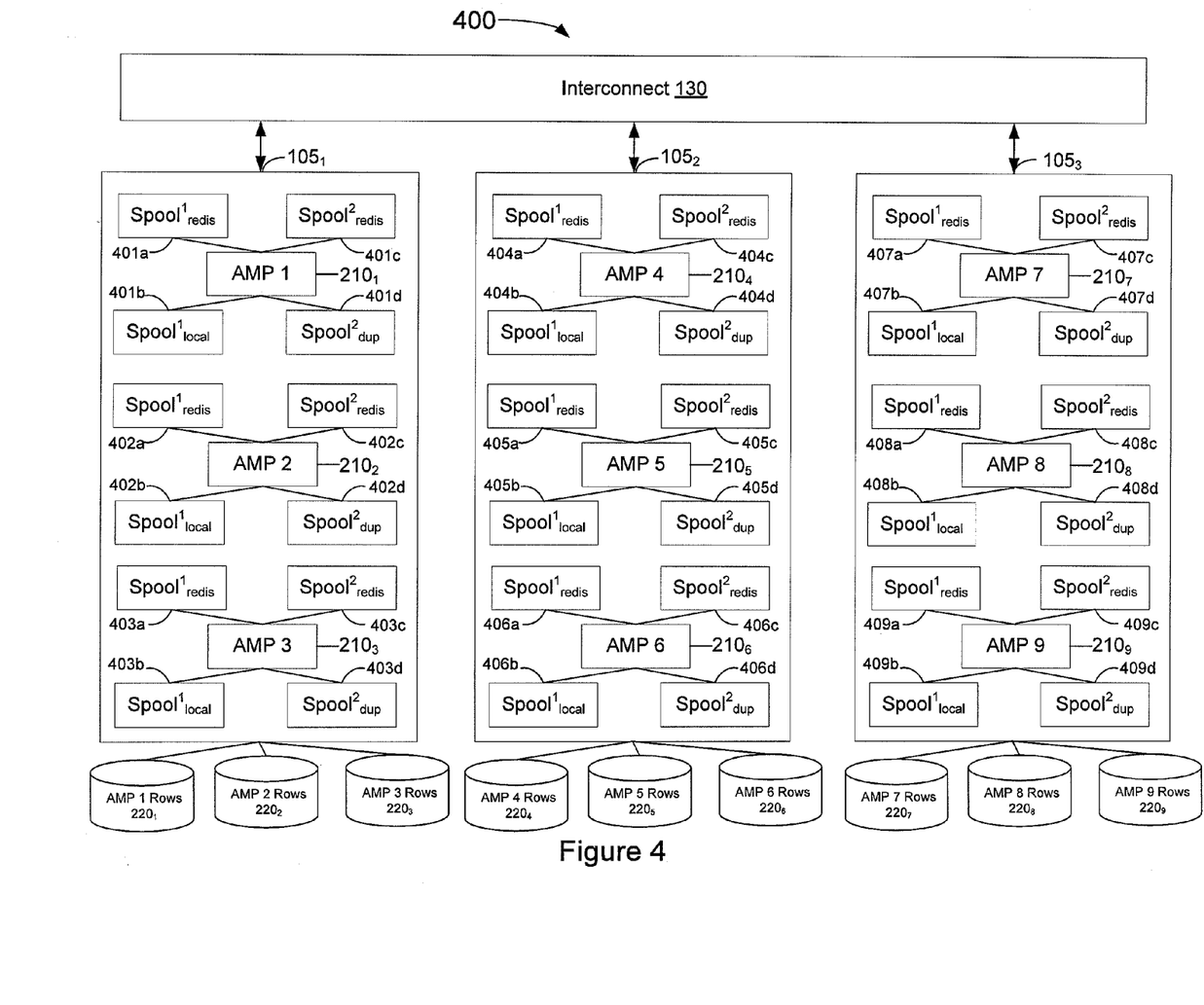
FIG. 4 is a diagrammatic representation of a massively parallel system configuration that facilitates a partial redistribution, partial duplication mechanism in accordance with an embodiment.

FIG. 4 is a diagrammatic representation of an MPP system configuration 400 that facilitates a partial redistribution, partial duplication mechanism in accordance with an embodiment. In the continuing example, a join operation is to be performed on join columns Table1.a and Table2.b, the rows of the tables have been distributed among a plurality of AMPs $210_1$-$210_9$ by, for example, a hash of respective primary indexes of the tables Table1 and Table2, and join columns Table1.a and Table2.b are not included in the indexes on which the tables are originally distributed in the MPP system. Thus, one or more of the AMPs $210_1$-$210_9$ have respective rows $220_1$-$220_9$ distributed thereto.

Each AMP having rows of Table1 distributed thereto allocates a respective spool $\text{Spool}^1_{local}$. In the continuing example, AMPs $210_1$-$210_9$ have rows of Table1 allocated thereto as depicted and described with reference to FIG. 2. Accordingly, each of the AMPs $210_1$-$210_9$ allocate a respective spool $\text{Spool}^1_{local}$ 401b-409b. Each of the AMPs is provide a list L of the skewed values, e.g., from optimizer 122, and scans the rows $220_1$-$220_9$ of Table1 allocated thereto. The AMPs $210_1$-$210_9$ compare the value of the join column Table1.a of each row of Table1 with the skewed values list, L. Any row of Table1 that does not have an attribute value of Table1.a that matches a value of the skewed list L is hash redistributed on the join column value Table1.a. Any row of Table1 that does have an attribute value of Table1.a that matches a value of the skewed list L is appended to the AMP's spool $\text{Spool}^1_{local}$. The rows of the spool $\text{Spool}^1_{local}$ 401b-409b are not redistributed but are maintained locally by the respective AMPs $210_1$-$210_9$.

Each AMP having rows of Table2 distributed thereto allocates a respective spool $\text{Spool}^2_{dup}$. In the continuing example, AMPs $210_1$-$210_9$ have rows of Table2 allocated thereto as depicted and described with reference to FIG. 2. Accordingly, each of the AMPs $210_1$-$210_9$ allocate a respective spool $\text{Spool}^2_{dup}$ 401d-409d. Each of the AMPs is provide a list L of the skewed values, e.g., from optimizer 122, and scans the rows of Table2 allocated thereto. The AMPs $210_1$-$210_9$ compare the value of the join column Table2.b of each row of Table2 with the skewed values list, L. Any row of Table2 that does not have an attribute value of Table2.b that matches a value of the skewed list L is hash redistributed on the join column value Table2.b. Any row of Table2 that does have an attribute value of Table2.b that matches a value of the skewed list L is duplicated to each AMP. For example, rows of Table2 having a skewed column value Table2.b may be temporarily stored in a duplicate buffer allocated to the AMP, and when the rows allocated to the AMP have been evaluated for skewed values, the rows identified as having a skewed value Table2.b are duplicated to each AMP $210_1$-$210_9$ that store the duplicated rows in the respective spool $\text{Spool}^2_{dup}$ 401d-409d. In the continuing example, assume each of the AMPs $210_1$-

$210_9$ receives at least one row of Table1 via redistribution from another AMP. Accordingly, rows of Table2 having a skewed value Table2.b are duplicated to respective spools $Spool^2_{dup}$ 401d-409d allocated for each of the AMPs $210_1$-$210_9$. In the instance an AMP does not have a spool $Spool^2_{dup}$ allocated thereto prior to the duplication, the AMP may allocate a spool $Spool^2_{dup}$ on the first receipt of duplicated row(s).

When an AMP receives a row of Table1 that has been redistributed to the AMP, the AMP may allocate a spool $Spool^1_{redis}$. Each redistributed row of Table1 that is received by the AMP is appended to the AMPs spool $Spool^1_{redis}$. Likewise, when an AMP receives a row of Table2 that has been redistributed to the AMP, the AMP may allocate a spool $Spool^2_{reis}$. Each redistributed row of Table2 that is received by the AMP is appended to the AMPs spool $Spool^2_{redis}$. In the present example, assume each of the AMPs $210_1$-$210_9$ receives at least one redistributed row of both tables Table1 and Table2. Accordingly, each of the AMPs $210_1$-$210_9$ allocates a respective spool $Spool^1_{redis}$ 401a-409a and a spool $Spool^2_{redis}$ 401c-409c.

Each of the AMPs then generates a respective first data set by joining rows of the spools $Spool^1_{redis}$ 401a-409a with rows of the spool $Spool^2_{redis}$ 401c-409c on the join columns Table1.a and Table2.b. The AMPs then generate a respective second data set by joining the rows of the spools $Spool^1_{local}$ 401b-409b with rows of the spool $Spool^2_{dup}$ 401d-409d on the join columns Table1.a and Table2.b. A local join data set is then generated by each of the AMPs $210_1$-$210_9$ by a union of the AMPs' respective first data set and second data set. The parallel join operation is then completed by a union of each AMP's local join data set.

Figure 5:
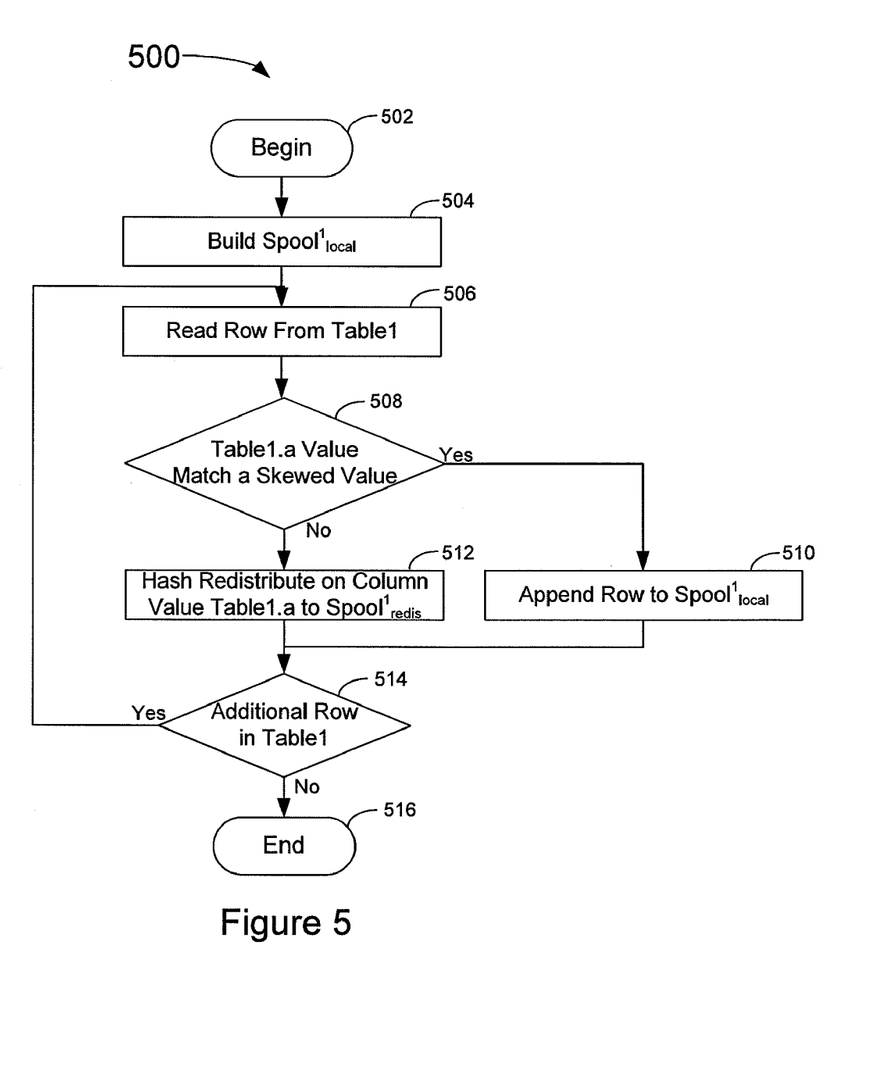
FIG. 5 is a flowchart that depicts processing of a partial redistribution, partial duplication subroutine that facilitates skew management for parallel join operations implemented in accordance with an embodiment.

FIG. 5 is a flowchart 500 that depicts processing of a PRPD subroutine that facilitates skew management for parallel join operations implemented in accordance with an embodiment. The processing steps of FIG. 5 may be implemented as computer-executable instructions tangibly embodied on a computer-readable medium executable by a processing system, such as one or more of the AMPs $210_1$-$210_9$ depicted in FIG. 4 of the database system 100 depicted in FIG. 1. An instance of the PRPD subroutine depicted and described with reference to FIG. 5 is run on each AMP that has rows of the skewed Table1 initially distributed thereto.

The PRPD subroutine is invoked (step 502), and the AMP allocates a spool $Spool^1_{local}$ (step 504). In the example provided hereinabove, each of the AMPs $210_1$-$210_9$ initially have rows of Table1 distributed thereto. Accordingly, each of the AMPs $210_1$-$210_9$ allocate a respective spool $Spool^1_{local}$ 401b-409b. Each of the AMPs then begins reading rows of Table1 from the rows $220_1$-$220_9$ originally distributed thereto (step 506). The attribute value of the join column Table1.a of a row of Table1 is then read and compared with the skewed values list L, and an evaluation is made to determine if the Table1.a value of the row matches a skewed value (step 508). If the attribute value of Table1.a of the row read from Table1 matches a skewed value, the AMP appends the row to the AMP's spool $Spool^1_{local}$ (step 510), and the PRPD subroutine may then proceed to evaluate whether an additional row of Table1 remains to be processed (step 514). If the attribute value of Table1.a of the row read from Table1 does not match a skewed value, the AMP hashes the row on the join column value Table1.a and redistributes the row according to the hash value (step 512). An evaluation may then be made to determine if any additional rows of Table1 remain for processing according to step 514. If an additional row of Table1 remains, the AMP may then read the row according to step 506. When no additional rows of Table1 remain to be evaluated, the PRPD subroutine cycle may then end (step 516).

Figure 6:
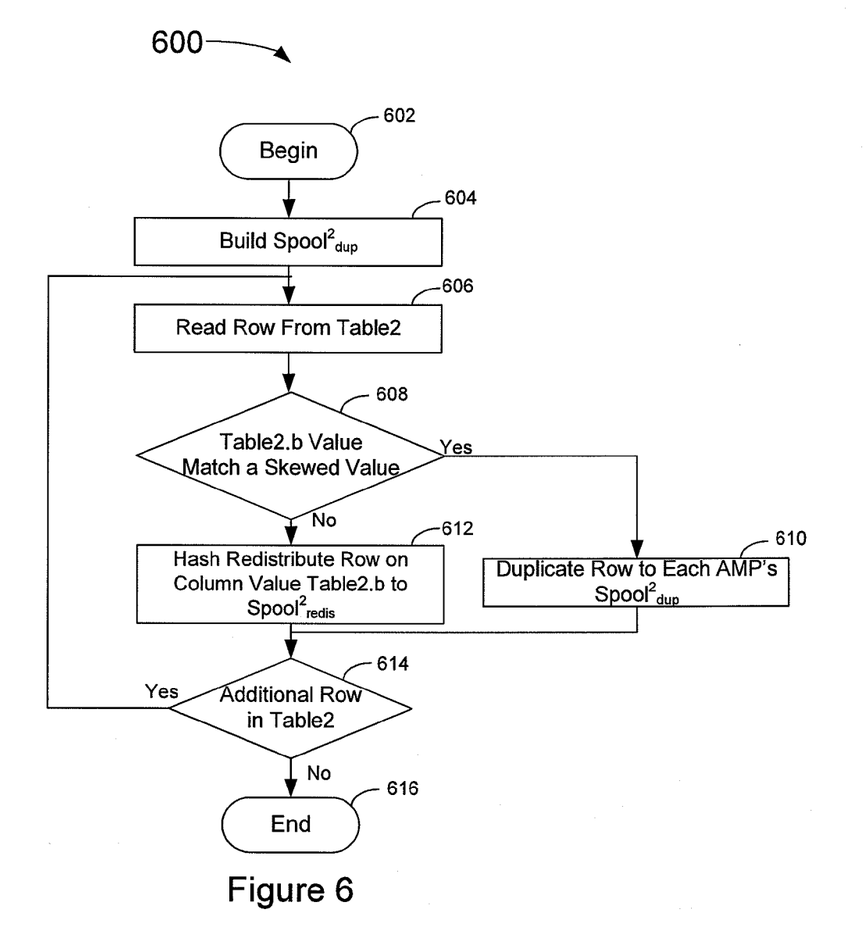
FIG. 6 is a flowchart that depicts processing of a partial redistribution, partial duplication subroutine that facilitates skew management for parallel join operations implemented in accordance with an embodiment.

FIG. 6 is a flowchart 600 that depicts processing of a PRPD subroutine that facilitates skew management for parallel join operations implemented in accordance with an embodiment. The processing steps of FIG. 6 may be implemented as computer-executable instructions tangibly embodied on a computer-readable medium executable by a processing system, such as one or more of the AMPs $210_1$-$210_9$ depicted in FIG. 4 of the database system 100 depicted in FIG. 1. An instance of the PRPD subroutine depicted and described with reference to FIG. 6 is run on each AMP that has rows of the Table2 initially distributed thereto.

The PRPD subroutine is invoked (step 602), and the AMP allocates a spool $Spool^2_{dup}$ (step 604). In the example provided hereinabove, each of the AMPs $210_1$-$210_9$ initially have rows of Table2 distributed thereto. Accordingly, each of the AMPs $210_1$-$210_9$ allocate a respective spool $Spool^2_{dup}$ 401d-409d. Each of the AMPs $210_1$-$210_9$ then begins reading rows of Table2 from the rows $220_1$-$220_9$ originally distributed thereto (step 606). The attribute value of the join column Table2.b of a row of Table2 is then read and compared with the skewed values list L, and an evaluation is made to determine if the Table2.b value matches a skewed value (step 608). If the attribute value of Table2.b of the row read from Table2 matches a skewed value, the row is duplicated to each AMP's spool $Spool^2_{dup}$ (step 610). Row duplication may be batch processed, e.g., by accumulating rows having a skewed value Table2.b in a duplicate buffer and duplicating the accumulated buffer contents after the AMP has identified each row having a skewed attribute value Table2.b. It should be understood that each AMP, including the AMP that sources rows to be duplicated, has the duplicated rows stored in the AMP's respective spool $Spool^2_{dup}$. The PRPD subroutine may then proceed to determine whether an additional row of Table2 remains to be evaluated (step 614). If the attribute value of Table2.b of the row read from Table2 does not match a skewed value, the AMP hashes the row on the join column value Table2.b and redistributes the row to an AMP's spool $Spool^2_{redis}$ according to the hash value (step 612). An evaluation may then be made to determine if any additional rows of Table2 remain for processing according to step 614. If an additional row of Table2 remains, the AMP may then read the row according to step 606. When no additional rows of Table2 remain to be evaluated, the PRPD subroutine cycle may then end (step 616).

Figure 7:
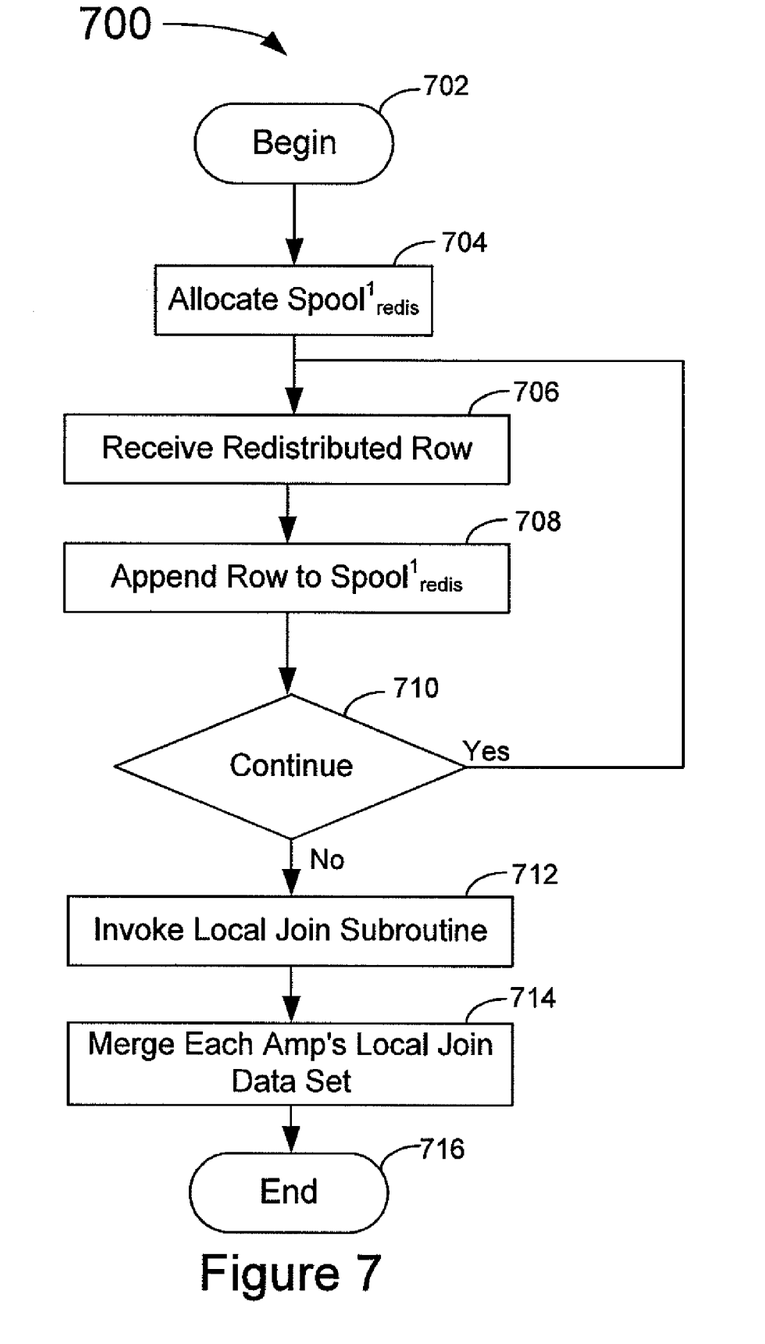
FIG. 7 is a flowchart that depicts processing of a partial redistribution, partial duplication subroutine that provides for receipt of redistributed rows to facilitate management of data skew encountered in a parallel join operation implemented in accordance with an embodiment.

FIG. 7 is a flowchart 700 that depicts processing of a PRPD subroutine that provides for receipt of redistributed rows to facilitate management of data skew encountered in a parallel join operation implemented in accordance with an embodiment. The processing steps of FIG. 7 may be implemented as computer-executable instructions tangibly embodied on a computer-readable medium executable by a processing system, such as one or more of the AMPs $210_1$-$210_9$ depicted in FIG. 4 of the database system 100 depicted in FIG. 1. An instance of the PRPD subroutine depicted and described with reference to FIG. 7 may be run for each AMP that receives redistributed rows from any AMP involved in the join operation.

The PRPD subroutine is invoked (step 702), and the AMP allocates a spool $Spool^1_{redis}$ for storage of redistributed rows received thereby (step 704). The AMP then receives a redistributed row (step 706). In the present example, assume the redistributed row comprises a row of Table1. The row is then appended to the AMP's spool $Spool^1_{redis}$ (step 710). After the row is appended to the spool $Spool^1_{redis}$, an evaluation may be made to determine if the routine is to continue (step 710), e.g., if additional rows are being received by the AMP via redistribution.

When the AMP has received all the rows to be redistributed and duplicated thereto, a local join subroutine is invoked (step 712) as described more fully hereinbelow with reference to FIG. 8. After the local join subroutine has been run for each AMP, the parallel join operation may be completed by merging a respective local join data set of each AMP (step 714), and the PRPD subroutine cycle then ends (step 716). In a similar manner, a PRPD subroutine may be run for each AMP that provides for receipt of Table2 redistributed rows and storage of the Table2 redistributed rows in the AMP's spool $Spool^2_{redis}$ to facilitate management of data skew encountered in a parallel join operation.

Figure 8:
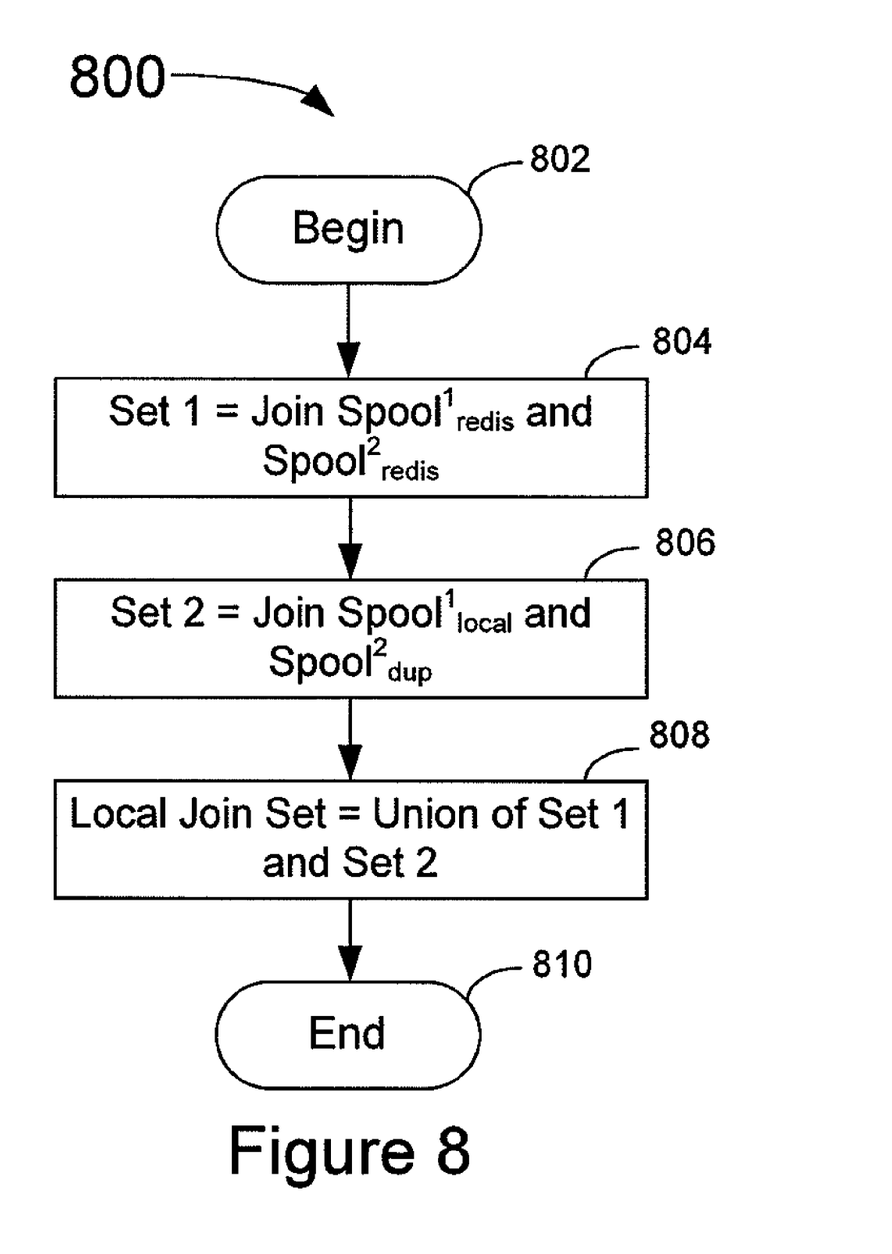
FIG. 8 is a flowchart that depicts processing of an instance of a local join subroutine that performs a local join in accordance with an embodiment.

FIG. 8 is a flowchart 800 that depicts processing of an instance of a local join subroutine that performs a local join in accordance with an embodiment. The processing steps of FIG. 8 may be implemented as computer-executable instructions tangibly embodied on a computer-readable medium executable by a processing system, such as one or more of the AMPs $210_1$-$210_9$ depicted in FIG. 4 of the database system 100 depicted in FIG. 1. The processing steps of FIG. 8 generally correspond to step 712 of FIG. 7.

The local join subroutine is invoked (step 802), and the AMP generates a first data set (Set 1) by joining the AMP's $Spool^1_{redis}$ and $Spool^2_{redis}$ (step 804). Each AMP generates a second data set (Set 2) by joining the AMP's spool $Spool^1_{local}$ and spool $Spool^2_{dup}$ (step 806). The AMP then generates a local join data set by joining the Set 1 and Set 2 resulting from steps 804 and 806 (step 808), and the local join subroutine then ends (step 810). The parallel join is then completed by merging each local join data set from each AMP according to step 716 of FIG. 7.

As described, a method, computer-readable medium, and system that facilitates management of data skew during a parallel join operation are provided. Portions of tables involved in the join operation are distributed among a plurality of processing modules, and each of the processing modules is provided with a list L of skewed values of a join column of a larger table involved in the join operation. Each of the processing modules scans the rows of the tables distributed to the processing modules and compares values of the join columns of both tables with the list of skewed values. Rows of the larger table having a join column value that match a skewed value are stored locally in a spool, while rows of the larger table having a join column value that do not match a skewed value are hash redistributed on the join column. Rows of the smaller table having a join column value that match a skewed value are duplicated to all the processing modules, while rows of the smaller table having a join column value that do not match a skewed value are hash redistributed on the join column. A local join data sets is generated by each of the processing modules, and the parallel join is completed by merging each of the processing module's local join data set. Accordingly, part of the larger table is redistributed and part of the larger table is maintained locally at the processing modules. Part of the smaller table is redistributed, and part of the smaller table is duplicated.

The flowcharts of FIGS. 5-8 depict process serialization to facilitate an understanding of disclosed embodiments and are not necessarily indicative of the serialization of the operations being performed. In various embodiments, the processing steps described in FIGS. 5-8 may be performed in varying order, and one or more depicted steps may be performed in parallel with other steps. Additionally, execution of some processing steps of FIGS. 5-8 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the disclosed embodiments may be implemented in software, hardware, firmware, or a combination thereof. The various elements of the system, either individually or in combination, may be implemented as a computer program product tangibly embodied in a machine-readable storage device for execution by a processing unit. Various steps of embodiments may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying aspects of the disclosed embodiments can be loaded onto a computer. The computer program is not limited to any particular embodiment, and may, for example, be implemented in an operating system, application program, foreground or background process, or any combination thereof, executing on a single processor or multiple processors. Additionally, various steps of embodiments may provide one or more data structures generated, produced, received, or otherwise implemented on a computer-readable medium, such as a memory.

Although disclosed embodiments have been illustrated in the accompanying drawings and described in the foregoing description, it will be understood that embodiments are not limited to the disclosed examples, but are capable of numerous rearrangements, modifications, and substitutions without departing from the disclosed embodiments as set forth and defined by the following claims. For example, the capabilities of the disclosed embodiments can be performed fully and/or partially by one or more of the blocks, modules, processors or memories. Also, these capabilities may be performed in the current manner or in a distributed manner and on, or via, any device able to provide and/or receive information. Still further, although depicted in a particular manner, a greater or lesser number of modules and connections can be utilized with the present disclosure in order to accomplish embodiments, to provide additional known features to present embodiments, and/or to make disclosed embodiments more efficient. Also, the information sent between various modules can be sent between the modules via at least one of a data network, an Internet Protocol network, a wireless source, and a wired source and via a plurality of protocols.

What is claimed is:

1. A method of performing a join operation in a parallel processing system that includes at least one processor, comprising:

distributing a respective set of rows of a first table and a second table involved in a join operation to each of a plurality of processing modules, wherein the join operation comprises a join on a column of the first table and a column of the second table, and wherein the first table is larger than the second table;

receiving, by each of the plurality of processing modules, a list of skewed values of the column of the first table, wherein the skewed values are not uniformly distributed among the plurality of processing modules by the distributing of the respective set of rows of the first table;

redistributing, by each of the plurality of processing modules to at least another one of the plurality of processing modules, one or more rows of the distributed respective set of rows involved in the join operation that each has a value of the column of the first table that does not match any one of the skewed values, and one or more rows of the distributed respective set of rows involved in the join operation that each has a value of the column of the second table that does not match any one of the skewed values;

locally maintaining, by a first processing module of the plurality of processing modules, one or more of the distributed respective set of rows that each has a value of the column of the first table that matches one of the skewed values;

duplicating, by a second processing module of the plurality of processing modules, one or more of the distributed respective set of rows that each has a value of the column of the second table that matches one of the skewed values; and performing the join operation by the plurality of the processing modules on the column of the first table and the column of the second table.

2. The method of claim 1, wherein the redistributing of the one or more rows of the respective set of rows further comprises: generating a hash value of the column of the first table for a row of the first table; and redistributing the row to one of the plurality of processing modules based on the hash value.

3. The method of claim 1, wherein the redistributing of the one or more rows of the respective set of rows further comprises: generating a hash value of the column of the second table for a row of the second table; and redistributing the row to one of the plurality of processing modules based on the hash value.

4. The method of claim 1, wherein the locally maintaining of the one or more rows comprises maintaining any row of the respective set of rows that has a value of the column of the first table that matches one of the skewed values in a spool allocated to the first processing module for rows of the respective set that are not redistributed.

5. The method of claim 1, wherein the duplicating a row of the respective set of rows comprises: transmitting all rows of the respective set of rows that have a value of the column of the second table that matches of the skewed values to each of the plurality of processing modules; and storing, by each of the plurality of processing modules, all the transmitted rows to a respective spool allocated for storing duplicated rows.

6. The method of claim 1, further comprising: allocating a respective first spool to each of the plurality of processing modules that receives a redistributed row of the first table; storing, by each of the plurality of processing modules that receives a redistributed row of the first table, redistributed rows of the first table in the respective first spool; allocating a respective second spool to each of the plurality of processing modules that receives a redistributed row of the second table; storing, by each of the plurality of processing modules that receives a redistributed row of the second table, redistributed rows of the second table in the respective second spool; storing, by each of the plurality of processing modules that receives a duplicated row, each duplicated row in a respective third spool allocated for storage of duplicated rows; and storing, by each processing module of the plurality of processing modules that locally maintains one or more rows of the respective set of rows that each has a value of the column of the first table that matches one of the skewed values, one or more rows locally maintained by the processing module in a respective fourth spool allocated for storage of rows of the first table that are locally maintained.

7. The method of claim 6, further comprising: generating, by each of the plurality of processing modules, a respective first data set by joining rows of the respective first spool with rows of the respective second spool; generating, by each of the plurality of processing modules, a respective second data set by joining rows of the respective third spool with rows of the respective fourth spool; and generating, by each of the plurality of processing modules, a respective local join data set by generating a union of the respective first data set and the respective second data set.

8. The method of claim 7, further comprising completing the join operation by generating a union of the respective local join data set of each of the plurality of processing modules.

9. A non-transient computer-readable medium including computer-executable instructions for execution by a processing system, the computer-executable instructions for performing a join operation in a parallel processing system, the computer-executable instructions, when executed, cause the processing system to:

distribute a respective set of rows of a first table and a second table involved in a join operation to each of a plurality of processing modules, wherein the join operation comprises a join on a column of the first table and a column of the second table, and the first table is larger than the second table;

receive, by each of the plurality of processing modules, a list of skewed values of the column of the first table, wherein the skewed values are not uniformly distributed among the plurality of processing modules by the distributing of the respective set of rows of the first table;

redistribute, by each of the plurality of processing module to at least another one of the processing modules, one or more rows of the distributed respective set of rows involved in the join operation that each has a value of the column of the first table that does not match any one of the skewed values, and one or more rows of the distributed respective set of rows involved in the join operation that each has a value of the column of the second table that does not match any one of the skewed values;

maintain locally, by a first processing module of the plurality of processing modules, one or more rows of the distributed respective set of rows that each has a value of the column of the first table that matches one of the skewed values;

duplicate, by a second processing module of the plurality of processing modules, one or more rows of the distributed respective set of rows that each has a value of the column of the second table that matches one of the skewed values; and perform the join operation by the plurality of the processing modules on the column of the first table and the column of the second table.

10. The computer-readable medium of claim 9, wherein the instructions that cause the processing system to redistribute one or more rows of the respective set of rows further comprise instructions that, when executed, cause the processing system to: generate a hash value of the column of the first table for a row of the first table; and redistribute the row to one of the plurality of processing modules based on the hash value.

11. The computer-readable medium of claim 9, wherein the instructions that cause the processing system to redistribute one or more rows of the respective set of rows further comprise instructions that, when executed, cause the processing system to: generate a hash value of the column of the second table for a row of the second table; and redistribute the row to one of the plurality of processing modules based on the hash value.

12. The computer-readable medium of claim 9, wherein the instructions that cause the processing system to maintain locally one or more rows comprise instructions that cause the processing system to maintain any row of the respective set of rows that has a value of the column of the first table that matches one of the skewed values in a spool allocated to the first processing module for rows of the respective set that are not redistributed.

13. The computer-readable medium of claim 9, wherein the instructions that cause the processing system to duplicate a row of the respective set of rows comprise instructions that, when executed, cause the processing system to: transmit all rows of the respective set of rows that have a value of the column of the second table that matches one of the skewed values to each of the plurality of processing modules; and store, by each of the plurality of processing modules, all the transmitted rows to a respective spool allocated for storing duplicated rows.

14. The computer-readable medium of claim 9, further comprising instructions that, when executed, cause the processing system to: allocate a respective first spool to each of the plurality of processing modules that receives a redistributed row of the first table; store, by each of the plurality of processing modules that receives a redistributed row of the first table, redistributed rows of the first table in the respective first spool; allocate a respective second spool to each of the plurality of processing modules that receives a redistributed row of the second table; store, by each of the plurality of processing modules that receives a redistributed row of the second table, redistributed rows of the second table in the respective second spool; store, by each of the plurality of processing modules that receives a duplicated row, each duplicated row in a respective third spool allocated for storage of duplicated rows; and store, by each processing module of the plurality of processing modules that maintains locally any row of the respective set of rows that has a value of the column of the first table that matches one of the skewed values, any rows maintained locally by the processing module in a respective fourth spool allocated for storage of rows of the first table that are maintained locally.

15. The computer-readable medium of claim 14, further comprising instructions that, when executed, cause the processing system to: generate, by each of the plurality of processing modules, a respective first data set by joining rows of the respective first spool with rows of the respective second spool; generate, by each of the plurality of processing modules, a respective second data set by joining rows of the respective third spool with rows of the respective fourth spool; and generate, by each of the plurality of processing modules, a respective local join data set by generating a union of the respective first data set and the respective second data set.

16. The computer-readable medium of claim 15, further comprising instructions that, when executed, cause the processing system to complete the join operation by generating a union of the respective local join data set of each of the plurality of processing modules.

17. A database management system, comprising:
a plurality of processing modules;
at least one storage device to which a respective set of rows of a first table and a second table involved in a join operation are allocated to each of the plurality of processing modules, wherein the first table is larger than the second table and the join operation comprises a join on a column of the first table and a column of the second table;
and an optimizer that distributes a list of skewed values of the column of the first table to each of the plurality of processing modules, wherein the skewed values are not uniformly distributed among the plurality of processing modules, and
wherein each processing module of the plurality of processing modules is operable to:
redistribute one or more rows of the distributed respective set of rows involved in the join operation that each has as a value of the column of the first table that does not match any one of the skewed values, and one or more rows of the distributed respective set of rows involved in the join operation that each has a value of the column of the second table that does not match any one of the skewed values;
locally maintain one or more rows of the distributed respective set of rows that each has a value of the column of the first table that matches one of the skewed values ; and
duplicate one or more rows of the distributed respective set of rows that each has a value of the column of the second table that matches one of the skewed values; and
perform at least a part of the join operation on the column of the first table and the column of the second table.

18. The system of claim 17, wherein one or more of the processing modules that locally maintain ne or more rows of the first table store the maintained rows in a spool respectively allocated to the processing module for rows of the respective set that are not redistributed.

19. The system of claim 17, wherein a respective first spool is allocated to each of the plurality of processing modules that receives a redistributed row of the first table for storage of the redistributed row of the first table, wherein a respective second spool is allocated to each of the plurality of processing modules that receives a redistributed row of the second table for storage of the redistributed row of the second table, wherein a respective third spool is allocated to each of the plurality of processing modules that receive a duplicated row for storage of the duplicated row, and wherein a respective fourth spool is allocated to each of the plurality of processing modules that locally maintains one or more rows of the respective set of rows that each has a value of the column of the first table that matches one of the skewed values.

20. The system of claim 19, wherein each of the plurality of processing modules generates a respective first data set by joining rows of the respective first spool with rows of the respective second spool, generates a respective second data set by joining rows of the respective third spool with rows of the respective fourth spool, and generates a respective local join data set by generating a union of the respective first data set and the respective second data set, and wherein the join operation is completed by generating a union of the respective local join data set of each of the plurality of processing modules.

* * * * *